(12) United States Patent
Bedzyk (10) Patent No.: US 7,009,786 B2
(45) Date of Patent: Mar. 7, 2006

(54) ADJUSTABLE MOUNT FOR CYLINDRICAL LENS

(75) Inventor: Mark D. Bedzyk, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 32 days.

(21) Appl. No.: 10/829,751

(22) Filed: Apr. 22, 2004

(65) Prior Publication Data

US 2005/0237636 A1    Oct. 27, 2005

(51) Int. Cl.
*G02B 7/02*    (2006.01)

(52) U.S. Cl. .................. 359/819; 359/821; 359/822

(58) Field of Classification Search ................ 359/819, 359/821, 822, 823, 824, 825, 826, 703, 704, 359/705, 706
See application file for complete search history.

(56) References Cited

U.S. PATENT DOCUMENTS

| | | | |
|---|---|---|---|
| 3,204,471 A | 9/1965 | Rempel | 359/274 |
| 3,596,863 A | 8/1971 | Kasparek | 359/871 |
| 3,989,358 A | 11/1976 | Melmoth | 359/813 |
| 4,077,722 A | 3/1978 | Bicskei | 356/127 |
| 4,099,852 A | 7/1978 | Kobierecki et al. | 359/814 |
| 4,397,521 A | 8/1983 | Antos et al. | 359/217 |
| 4,408,830 A | 10/1983 | Wutherich | 359/813 |
| 4,652,095 A | 3/1987 | Mauro | 359/393 |
| 4,655,548 A | 4/1987 | Jue | 348/373 |
| 4,796,962 A | 1/1989 | DeJager et al. | 359/217 |
| 4,909,599 A | 3/1990 | Hanke et al. | 359/819 |
| 4,921,320 A | 5/1990 | DeJager et al. | 359/205 |
| 4,982,206 A | 1/1991 | Kessler et al. | 347/232 |
| 5,184,153 A | 2/1993 | Daniels et al. | 347/262 |
| 5,194,993 A | 3/1993 | Bedzyk | 257/753 |
| 5,210,648 A | 5/1993 | Bedzyk | 359/813 |
| 5,220,460 A | 6/1993 | Bedzyk | 359/813 |
| 5,907,439 A * | 5/1999 | Matsui | 359/700 |
| 6,768,599 B1 * | 7/2004 | Takanashi et al. | 359/819 |
| 6,853,503 B1 * | 2/2005 | Nomura et al. | 359/699 |

* cited by examiner

*Primary Examiner*—Timothy Thompson
(74) *Attorney, Agent, or Firm*—Nelson Adrian Blish (57) ABSTRACT

A positioning device disposes an optical component with respect to an optical axis. The positioning device has a lens carrier (14) for housing the lens (18) or other optical component, a mount (12) supporting the lens carrier along the optical axis, the lens carrier movable within the mount in at least one direction. An extended member is coupled to the lens carrier for setting the position of the carrier within the mount. A movable cam urges the extended member to effect movement in the at least one direction.

42 Claims, 7 Drawing Sheets

ADJUSTABLE MOUNT FOR CYLINDRICAL LENS

FIELD OF THE INVENTION

This invention generally relates to a device for adjustably mounting an optical element in an optical system; and, in particular, to mounting a cylindrical lens that is independently adjustable an optical axis, in an optical system such as in a laser printer.

BACKGROUND OF THE INVENTION

The positioning of a lens, mirror or similar optical element (hereafter "lens") involves spatially locating such element within six degrees of freedom. The lens is located translationally relative to each of three orthogonal axes directions generally designated as the x(scan), y(cross-scan), and z(beam path) axes directions. The lens is also located rotationally relative to three rotational directions, generally designated as the $\theta_x$, $\theta_y$, and $\theta_z$, directions, corresponding to angular rotation, respectively, about each of the x, y, and z axes.

Monolithic spherical lenses having one curved surface provide power magnification in two orthogonal directions, x and y, and focus parallel rays at a focal point corresponding to the center of curvature of the lens surface. Such lenses are used in laser printers, for example, for controlling beam spot size, convergence and focusing. Correct positioning of such spherical lenses in the x, y translational and $\theta_x$, $\theta_y$ rotational directions assures alignment of the focal point and center of the lens relative to an incident beam of light coincident with the z axis. Correct location of the lens along the z axis serves to assure proper focusing of an imaged object. Considerations for locating conjugate and composite spherical lens elements are similar.

Monolithic cylindrical lenses having one curved surface provide magnification in only one direction, x or y, and focus parallel rays to a line or lens cylinder axis parallel to the other direction, y or x respectively. Cylindrical lenses are used in laser printers, for example, for beam shaping, such as for controlling x-direction or y-direction elliptical beam spot size. Cylindrical lenses may be manufactured to have a planar surface opposite the curved surface which is generally parallel to the x-y plane. Such a lens can, thus, be located in the $\theta_x$ and $\theta_y$ rotational directions by orienting the x-y planar surface normal to the incident beam z axis direction. Variations in positioning in the non-magnification direction (i.e. variations in the y direction for magnification in the x direction, and vice versa) are not critical in many applications. Thus, once correct orientation of the x-y planar surface is established, locational precision is needed only in the x or y magnification translational and $\theta_z$ rotational directions. Location in the z direction is left adjustable for focusing purposes.

Conventional mounts for multiple degree-of-freedom positioning of optical elements nest multiple structural components for independent relative movement, one with respect to the other, to achieve the required translational and/or rotational positioning. For example, U.S. Pat. No. 4,652,095 (Mauro) describes an arrangement of three nested stages, each having a table shiftable along rails in a respective x, y, or z translational direction by a threaded rod movable against the force of an opposing spring. The stages are nested, with the optical element mounted for movement with the table of the first stage, the first stage mounted for movement with the table of the second stage, and the second stage mounted for movement with the table of the third stage. U.S. Pat. No. 3,596,863 (Kasparek) shows an arrangement of nested flexural pivots, each providing a respective $\theta_x$, $\theta_y$, and $\theta_z$ rotational adjustment. Other examples of nested optical element mounting arrangements are given in U.S. Pat. No. 3,204,471 (Rempel); U.S. Pat. No. 4,077,722 (Bicskei); U.S. Pat. No. 4,099,852 (Kobierecki et al.); and U.S. Pat. No. 4,655,548 (Jue).

Mounting arrangements that provide multiple degree of freedom lens positioning, without nesting, are shown in U.S. Pat. No. 3,989,358 (Melmoth) and U.S. Pat. No. 4,408,830 (Wutherich). U.S. Pat. No. 3,989,358 provides independent x and y translational adjustments by micrometer spindles that are moved against knife-edges, displaced 90 degrees circumferentially about a lens retaining ring. U.S. Pat. No. 4,408,830 provides x, y, and x-y translational adjustments by moving inclined faces of screw-driven cradle elements against corresponding angled corners of a rectangular lens retainer.

As a general observation, conventional devices for achieving six-degree-of-freedom positioning of optical elements tend to be unduly complex and costly. Moreover, when used for mounting cylindrical lenses in optical systems like those of laser printers or the like, precise machining utilized to ensure correct positioning in critical directions is wasted when applied also for non-critical ones. In general, prior art mounts seek to avoid the exertion of any torque directly on the lens itself. See, for example, U.S. Pat. No. 4,909,599 (Hanke et al.)

A number of innovative solutions have been proposed for cylindrical lens mounting without undue complexity. For example, commonly-assigned U.S. Pat. No. 5,194,993 (Bedzyk) discloses an inexpensive lens mount for positioning a cylindrical lens or similar optical element in an optical system like that of a laser printer, wherein six degree-of-freedom positioning is achieved with a minimum of nesting, taking advantage of physical characteristics of the lens, and employing a push-pull mechanism for applying a biasing torque on the lens, against which adjustments in the x or y axis magnification direction and $\theta_z$ rotational direction are made. As another example, commonly-assigned U.S. Pat. No. 5,220,460 (Bedzyk) discloses a lens mount that applies a biasing torque against the lens in the $\theta_z$ rotational direction. Yet another example is given in commonly-assigned U.S. Pat. No. 5,210,648 (Bedzyk). U.S. Pat. No. 5,210,648 discloses the use of a V-shaped channel track as a base for an adjustable mount, with the V-channel providing alignment along the optical axis. A carrier contains the lens itself, providing suitable orientation in x-y directions and $\theta_x$, and $\theta_y$ rotation, and movable along the V-channel for positioning adjustment along the z-axis. An extended bracket provides the $\theta_z$ rotational adjustment.

While the solutions offered in U.S. Pat. Nos. 5,194,993; 5,220,460; and 5,210,648 enable precision adjustment of lens positioning for all six degrees of freedom, the accessibility needed to make these adjustments can be a practical constraint in some situations, particularly for designs requiring compact packaging of pre-scan optical components. For example, the adjustable mount of U.S. Pat. No. 5,210,648 requires access to adjustment screws from both the front and the top of this unit. The adjustable mounts of U.S. Pat. Nos. 5,220,460 and 5,194,993 require access for adjustment from both the front and sides.

Thus it can be seen that there would be advantages to the design of an adjustable lens positioning mount having adjustments for z and $\theta_z$ positions accessible from a single direction.

SUMMARY OF THE INVENTION

It is an object of the present invention to provide an adjustable lens mount having adjustments for z positioning and $\theta_z$ rotation accessible from a single direction. With this object in mind, the present invention provides a positioning device for disposing an optical component relative to an optical axis, the positioning device comprising:

(a) a carrier for housing the optical component;
(b) a mount supporting the carrier along the optical axis, wherein the carrier is movable within the mount in at least one direction;
(c) an extended member coupled to the carrier for setting the position of the carrier within the mount; and
(d) a movable cam for urging the extended member to effect movement in at least one direction.

It is a feature of the present invention that it employs cam movement to provide high resolution rotational adjustment of a lens.

It is an advantage of the lens mount of the present invention that it provides suitable positioning in x, y and rotational $\theta_x$, and $\theta_y$ directions, allowing the z and coarse and fine $\theta_z$ rotation adjustments to be performed by turning adjustment screws on one side of the lens mount.

It is a further advantage of the present invention that it provides an apparatus that can be kept in place as part of an optical apparatus or can be used as a removable fixture for adjustment and potting of the optical components.

It is a further advantage of the apparatus of the present invention that it requires precision manufacture only for specific components, allowing low-cost fabrication of the lens mount itself.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

A typical optical system of the type to which the invention finds application includes an optical head for projecting a beam of laser light along an optical beam path coincident with a z axis direction. The beam is modulated in accordance with information received from an image signal generating circuit, and scanned line-by-line in an x axis (scan) direction by means of a rotating polygon onto a photosensitive film or other similar receiving medium. The medium is in turn moved in an y axis (cross-scan) direction by means of a rotating drum or the like. A start-of-scan detector controls the timing of the light beam modulation. Optical elements, including cylindrical lenses, are positioned between the optical head and the mirrored multiple facets of the polygon to control beam shaping, focusing and direction. Other optical elements, located between the polygon and the drum, correct for differences in beam focus due to the f-θ condition and focus the image in the cross-scan direction to avoid objectionable banding artifacts due to facet out-of-plane wobble and pyramid angle errors. Additional details concerning the functioning and operation of laser printers of this type are given in U.S. Pat. No. 5,184,153 (Daniels et al.); U.S. Pat. No. 4,397,521 (Antos et al.); U.S. Pat. No. 4,796,962 (DeJager et al.); U.S. Pat. No. 4,982,206 (Kessler et al.); and U.S. Pat. No. 4,921,320 (DeJager et al.)

Figure 1:
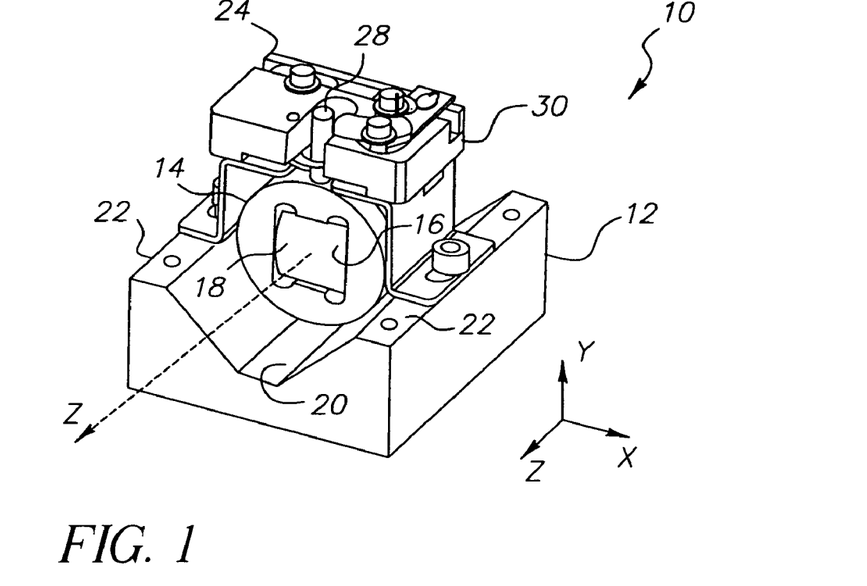
FIG. 1 is a perspective view showing an adjustable lens mount according to the present invention.

Referring to FIG. 1, there is shown an adjustable lens mount 10 of the present invention, in perspective view. Adjustable lens mount 10 is designed to locate a lens 18 for use in shaping the elliptical form of a scanning beam in either the x or y direction and for controlling its position on the optical axis (the z axis) and controlling its rotation along the z axis, $\theta_z$. Lens 18 shown in FIG. 1 is mounted with its focus in the y axis; however, those skilled in the art can readily appreciate that the same principles apply for a lens having focus in the x axis direction.

Adjustable lens mount 10 has a base 12 elongated in the z-axis direction and a lens carrier 14 including a central optical opening 16 that is concentric with the z axis. Base 12 has flat rails 22 on either side of a V-shaped track 20. V-shaped track 20 has an upwardly-opening channel that extends longitudinally in the z direction. Flat rails 22 also extend longitudinally in the z direction. In a preferred embodiment, V-shaped track 20 and flat rails 22 are formed to have uniform lateral cross section along the length of base 12.

Figure 2:
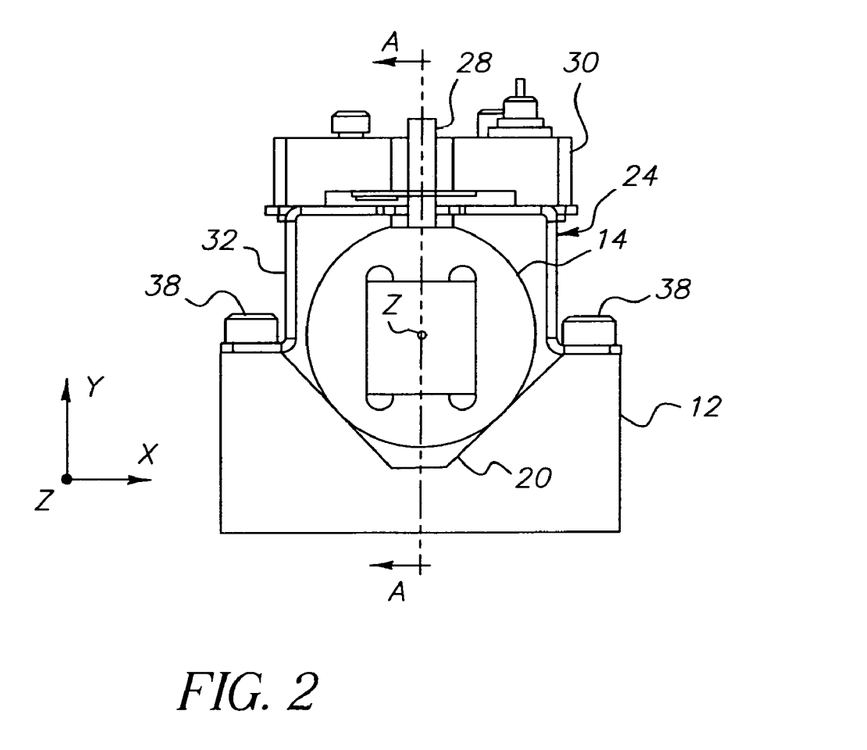
FIG. 2 is a front plan view showing the relationship of adjustable lens mount components to the optical axis.
Figure 3:
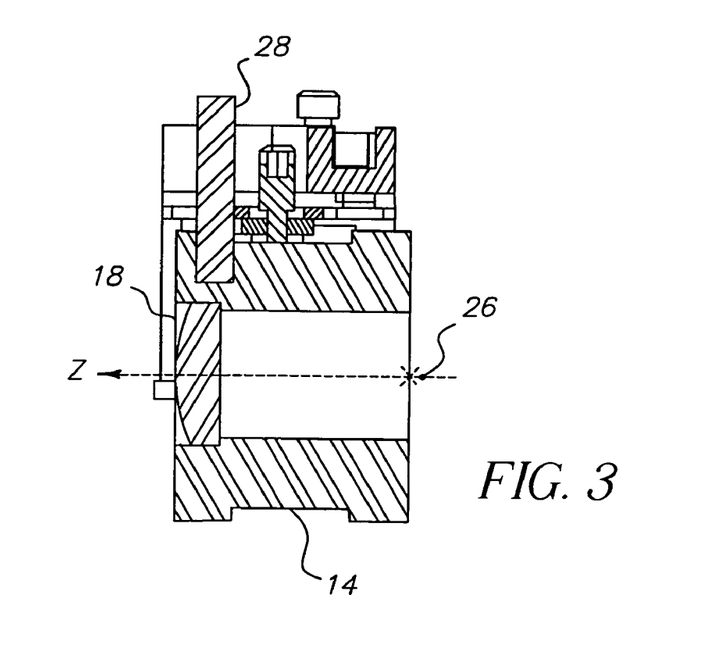
FIG. 3 is a cutaway side view showing components of FIG. 2.

Lens carrier 14 is configured for adjustable movement translationally in the z axis direction and rotationally in the $\theta_z$ direction within V-shaped track 20. Lens carrier 14 is a generally cylindrical body, shown within a positioning housing 24 that provides the various z and $\theta_z$ adjustment mechanisms described subsequently. Ideally, the body of lens carrier 14 and V-shaped track 20 in which it is seated are dimensioned, configured, and adapted so that the center of optical opening 16 coincides with optical axis z when lens carrier 14 is seated within base 12. Lens carrier 14 acts as an optical component housing, configured to mount lens 18, or other suitable optical device, substantially in parallel to the x-y plane of the optical system, so that x, y, and $\theta_x$ and $\theta_y$ positioning is automatically effected when lens carrier 14 is seated within V-shaped track 20 on base 12. Referring to the front view of FIG. 2 and to the side sectional view of FIG. 3 taken from reference line A—A in FIG. 2, the positional relationship of lens carrier 14 with respect to optical axis z and the orthogonal x and y axes is shown. A cylindrical lens axis 26 of lens 18 lies along optical axis z in this embodiment. A pin 28, aligned with the radius of rotation of lens carrier 14, cooperates with adjustment components in positioning housing 24 to effect both z-axis and $\theta_z$ adjustment, in a manner described subsequently.

Figure 4:
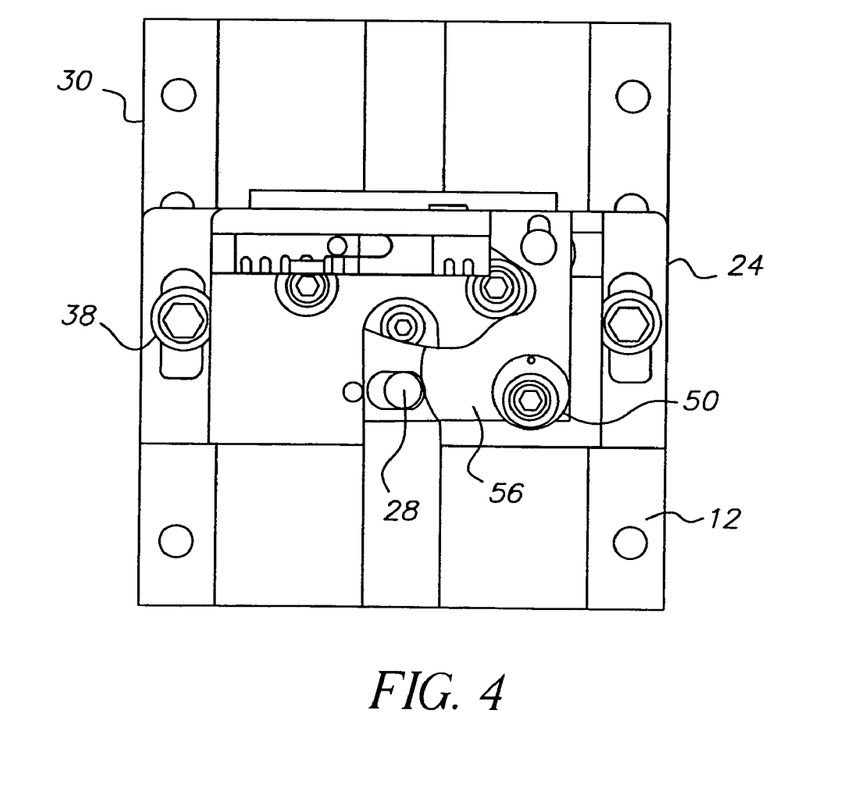
FIG. 4 is a top view of the alignment tool showing the positioning housing of the adjustable lens mount.
Figure 5:
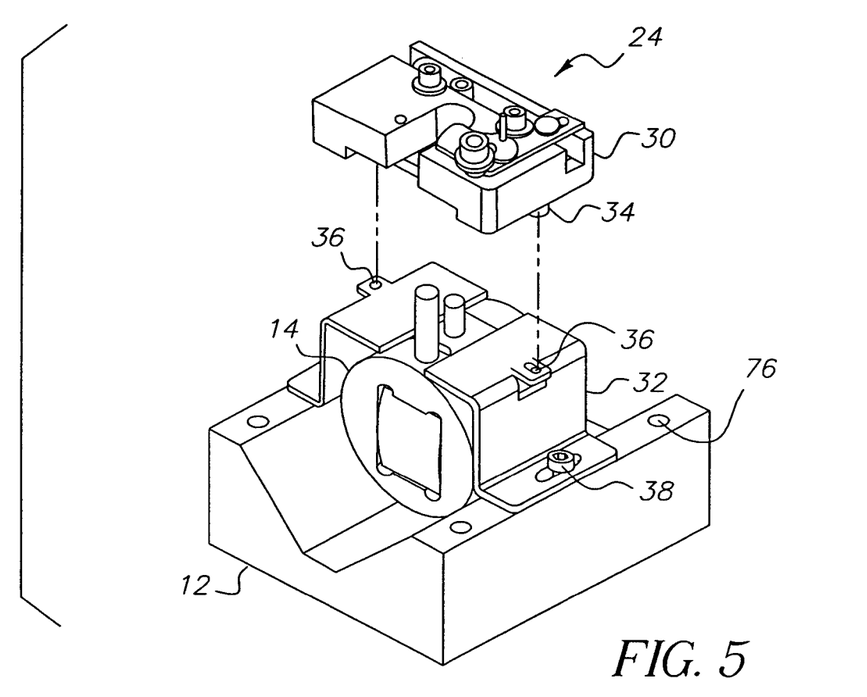
FIG. 5 is a partially exploded view showing how the alignment tool is seated on the adjustable lens mount.

Fitted on the top of positioning housing 24 is an alignment tool 30, as shown more clearly in the top view of FIG. 4 and removed from position in the partially exploded perspective view of FIG. 5. Mechanisms of alignment tool 30 are used to perform the linear z position adjustment and both coarse- and fine-$\theta_z$ rotational adjustments. In the embodiment shown, alignment tool 30 seats securely in place atop positioning housing 24 by means of pins 34 that engage holes 36 in a bracket 32. This arrangement enables removal of alignment tool 30 after adjustments are complete. However, alignment tool 30 may be kept in position in the optical apparatus, allowing later adjustments to be more easily made. Bracket 32 is itself secured to base 12 by mounting bolts 38 through threaded bores 76 on flat rails 22; of course, other arrangements for bracket 32 mounting could be used, as is well known to those skilled in the optical component mounting arts.

In general, adjustments for z and $\theta_z$ positioning will be made following a certain order, as described following. However, in practice, the adjustments described subsequently could be made in any order, depending on the requirements of the optical apparatus design.

Mechanism for z-Axis Adjustment

With the apparatus of the present invention, the first adjustment typically made is the linear z-positioning adjustment, which sets the relative position of lens carrier 14 along the optical axis (z axis), within V-shaped track 20. Initially, the z-position of lens carrier 14 is approximately measured, and positioning housing 24 mounted, so that this adjustment need only provide a more exacting positioning to about +/−0.031 inches in a preferred embodiment.

Figure 6:
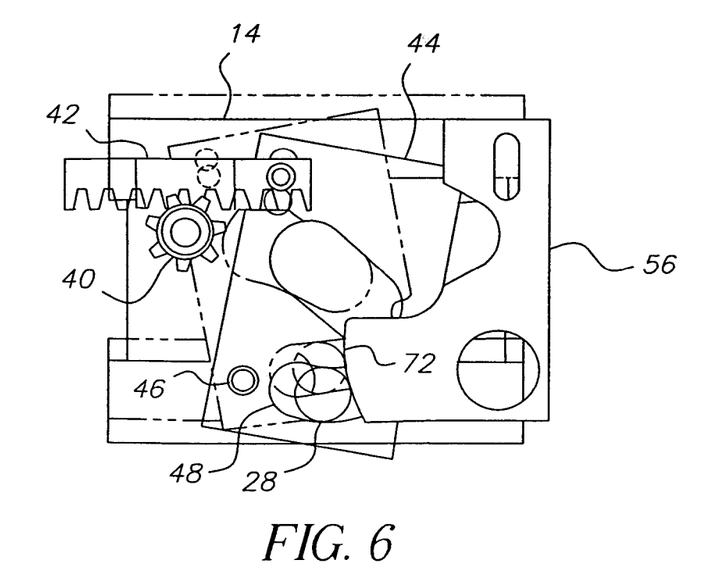
FIG. 6 is a top view showing the mechanical components used for adjustment along the z axis.
Figure 7:
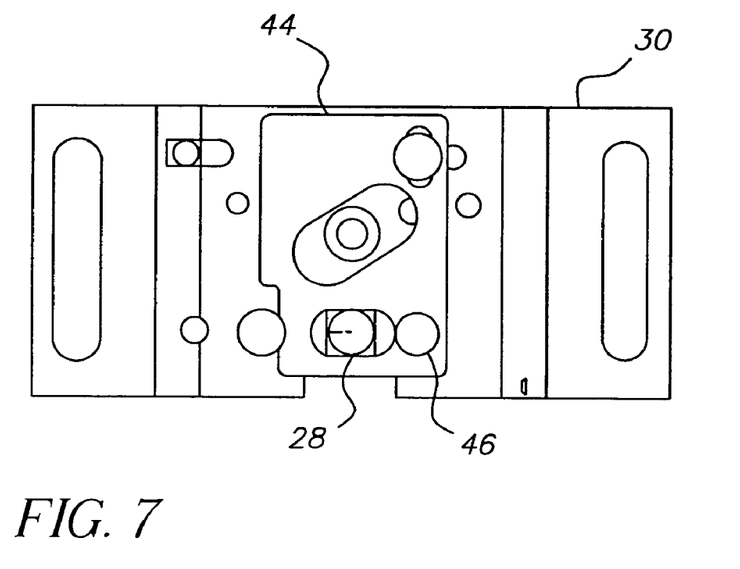
FIG. 7 is a bottom view of mechanical components for adjustment along the z axis.

Referring now to FIGS. 6 and 7, there are shown top view and bottom views, respectively, of components of alignment tool 30 that urge lens carrier 14 backwards or forwards along the z axis by applying force to pin 28. The top view representation of FIG. 6 is simplified to show components that provide z adjustment motion, excluding other mechanical components for simplicity. A z-adjustment pinion 40 cooperates with a gear 42 in rack-and-pinion fashion to shift the position of a z-positioning plate 44, a linkage that pivots about a pin 46, mounted to alignment tool 30. This action causes the edge surface of a slot 48 in z-positioning plate to press against the side of pin 28, thereby forcing lens carrier 14 to move in the z-direction, that is, along V-shaped track 20. The gear ratio, pivot pin 46 placement, and dimensioning of z-positioning plate 44 contact surfaces are configured to suit the required adjustment resolution and range. In a preferred embodiment, for example, a 1 degree rotation of z-adjust pinion 40 causes an approximately 0.00046 inch movement of lens carrier 14 along the z axis.

Figure 8:
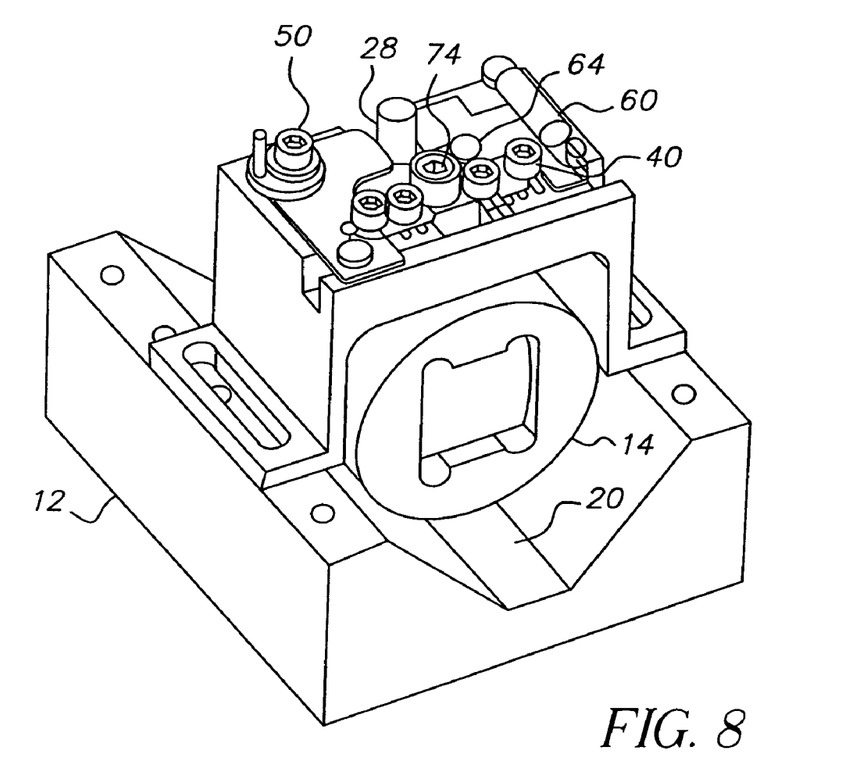
FIG. 8 is a perspective view showing adjustment screws on the top of the positioning housing of the present invention.

FIG. 7 shows the operation of alignment tool 30 for z-axis positioning from a bottom view, with lens carrier 14 and other components removed for clarity. FIG. 8 shows the position of alignment tool 30 components from a rear view (relative to FIG. 1). It can be observed that the gear-and-pinion arrangement of the embodiment shown is advantaged for positive engagement and mechanical robustness; however, other mechanisms could be used for this adjustment, such as a coupling using friction, for example.

Mechanism for Coarse $\theta_z$ Adjustment

Figure 9:
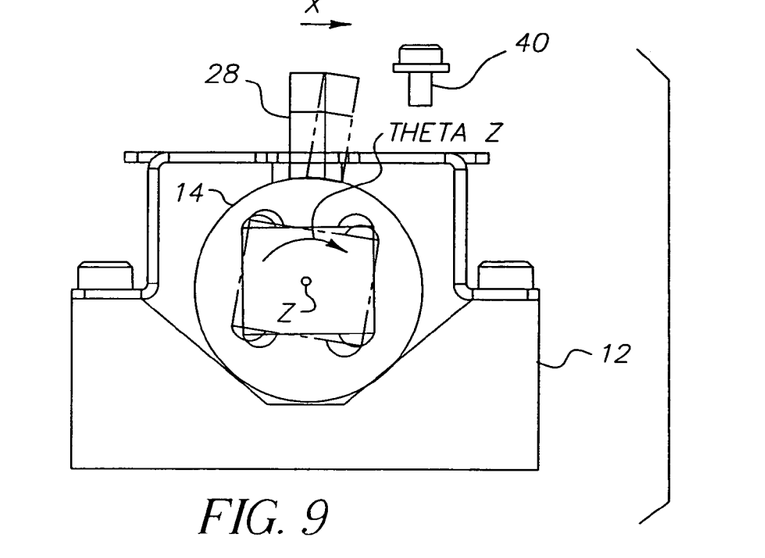
FIG. 9 is a front plan view showing how $\theta_z$ rotation of the lens carrier is achieved using a pin.

The front plan view of FIG. 9 shows the simple mechanism by which $\theta_z$ adjustment is performed using adjustable lens mount 10 of the present invention. As noted above, pin 28 is fitted within lens carrier 14, to be substantially aligned with a radius from the z-axis. Movement of pin 28 in the x-direction as shown causes rotation of lens carrier 14 about the z axis. This same type of x-direction movement is used for moving pin 28, first for coarse $\theta_z$ adjustment, then for fine $\theta_z$ adjustment.

Figure 10:
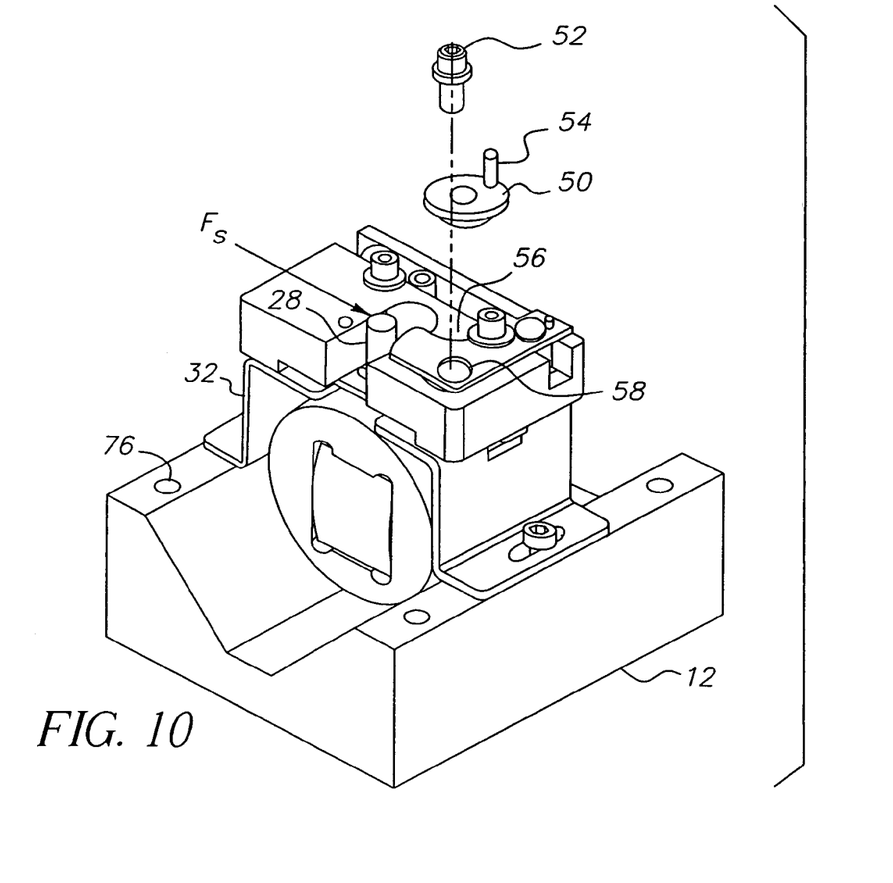
FIG. 10 is a perspective view showing components used for coarse $\theta_z$ adjustment.
Figure 11:
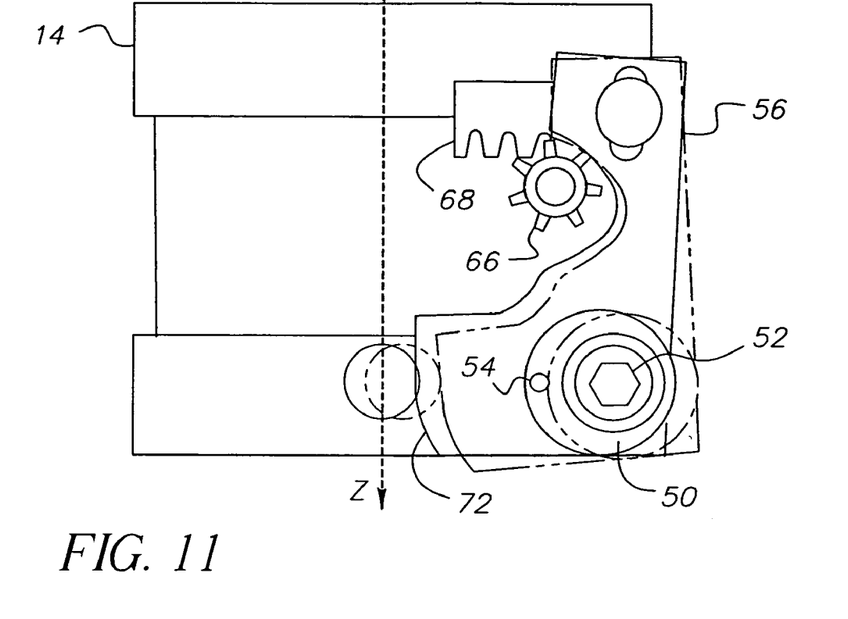
FIG. 11 is a top view showing the mechanical components used for coarse $\theta_z$ adjustment.

Referring to the partially exploded view FIG. 10 and the top view of FIG. 11, there is shown the overall mechanism for coarse $\theta_z$ adjustment. An eccentric cam 50, secured by a clamping screw 52, is positioned using a pin 54 to effect approximate angle $\theta_z$ adjustment. Eccentric cam 50 does this by setting a coarse position for a $\theta_z$ cam 56, a type of drive member that provides a contact surface 72 against which pin 28 locates. Rotating eccentric cam 50 within a hole 58 positions $\theta_z$ cam 56, thereby adjusting the position of pin 28. A spring force $F_s$, or similar type of loading force, is applied to load pin 28 against $\theta_z$ cam 56. The mechanism for applying spring force is shown more clearly in FIG. 8. A spring 60 applies force by means of a loading lever, which pivots on a pivot pin 64. In a preferred embodiment, coarse $\theta_z$ adjustment rotates lens carrier 14 to within about +/−0.15 degrees of the final fine $\theta_z$ adjustment. The dotted outline in FIG. 11 represents, in somewhat exaggerated form, the range of motion of $\theta_z$ cam 56 over the adjustment range of eccentric cam 50. When coarse $\theta_z$ adjustment is complete, clamping screw 52 is tightened to hold eccentric cam 50 in position.

Mechanism for Fine $\theta_z$ Adjustment

Figure 12:
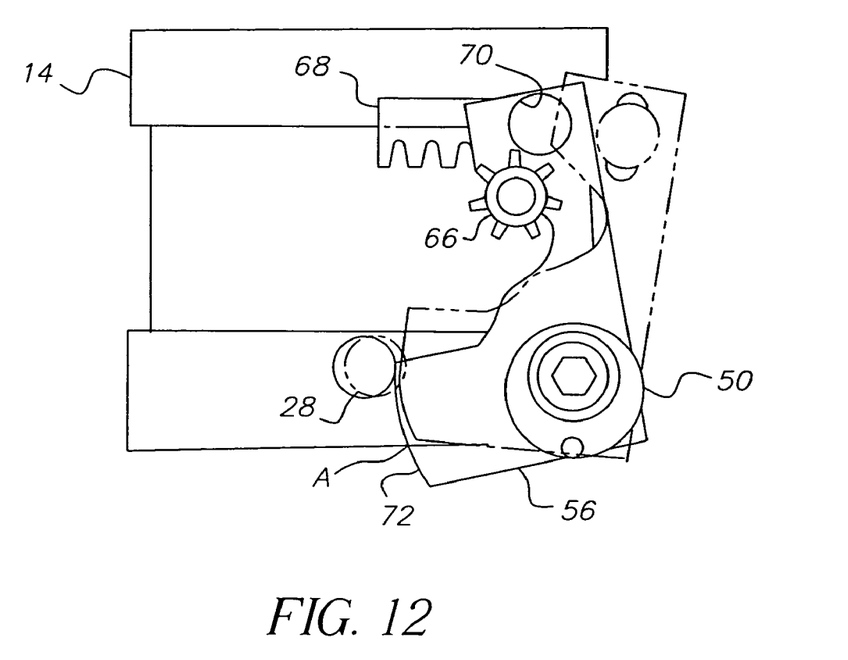
FIG. 12 is a top view showing the mechanical components used for fine $\theta_z$ adjustment.

Once the coarse $\theta_z$ adjustment has been performed, the fine $\theta_z$ adjustment can be made, using the mechanism shown in FIG. 12. The rack and pinion arrangement of a fine $\theta_z$ adjust pinion 66 and gear rack member 68, mechanically coupled to $\theta_z$ cam 56 at a pivot point 70, causes $\theta_z$ cam 56 to pivot about eccentric cam 50. Curved contact surface 72 of $\theta_z$ cam 56 provides the slight movement necessary over an arc A for precision adjustment against pin 28. The curvature dimensions of arcuate contact surface 72 in this embodiment can be designed to provide the needed range of motion and resolution needed for fine adjustment over the full travel path of $\theta_z$ cam 56. The dotted-line representation in FIG. 12 shows, in outline form, the $\theta_z$ fine adjustment mechanism at extremes of travel over arc A. (Here, the term "arc" is understood in its most general geometrical sense, as a smooth curve joining two points; arc A need not be a circular arc.) In a preferred embodiment, for example, a 1 degree rotation of fine $\theta_z$ adjust pinion 66 causes a lens carrier 14 rotation on the order of approximately 0.0023 degrees. It must be observed that contact surface 72 need not be arcuate; in practice, however, some amount of curvature is typically advantageous to allow fine adjustment at the needed resolution, particularly when making adjustments manually.

While the apparatus of the present invention allows precise adjustment in z and $\theta_z$, these adjustments are not wholly independent of each other. Because of this, the following sequence is typically followed for making adjustments using adjustable lens mount 10 of the present invention:

(1) Make linear z-axis positioning adjustment;
(2) Make coarse $\theta_z$ adjustment; and
(3) Make fine $\theta_z$ adjustment.

As with other types of optical systems where there is some interaction between mechanical mounting components, it may be necessary to repeat one or more adjustments as needed.

Once the fine $\theta_z$ adjustment is complete, lens carrier 14 can be locked into place using a locking screw 74, as shown in FIG. 8. Lens carrier 14 can then be potted in place against base 12 using conventional techniques well known in the optical arts, allowing the removal of both bracket 32 and alignment tool 30. Optionally, bracket 32 may be kept in place, allowing removal of alignment tool 30. Or, the complete adjustable lens mount 10 apparatus may be kept in place to facilitate subsequent readjustment. Pin 28 may be attached to lens carrier 14 or may be removable. For example, pin 28 may be threaded.

Alternate Embodiment for Fine z-axis Adjustment

Figure 13:
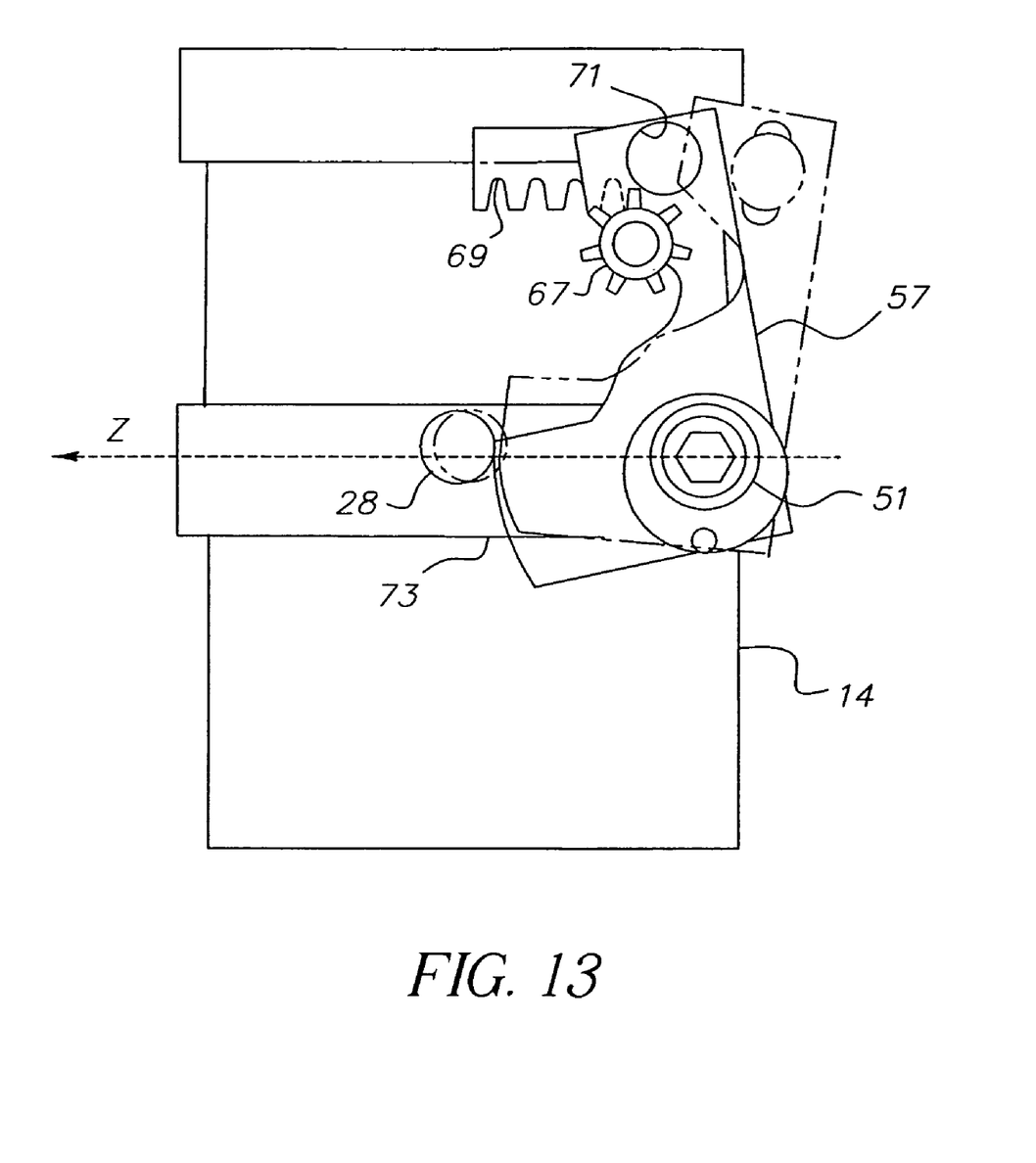
FIG. 13 is a top view showing an arrangement of mechanical components that can be used for effecting translation along the z-axis in an alternate embodiment.

While the preceding description gives detailed information on the use of $\theta_z$ cam 56 for effecting fine $\theta_z$ adjustment, a slight rearrangement of alignment tool 30 components allows this same type of adjustment mechanism to be used for z-axis adjustment as well. Referring to the top view of FIG. 13, it can be observed that specific components of alignment tool 30 have been rotated 90 degrees in the x-z plane for use in effecting precision z-axis translation of lens carrier 14. Here, a z-position cam 57 operates in a similar manner to $\theta_z$ cam 56 for urging pin 28 in the z-axis direction. Correspondingly, a fine z-adjust pinion 67 operates in a manner similar to fine $\theta_z$ adjust pinion 66, described with reference to FIG. 12, for making the adjustment. Fine z-adjust pinion 67 cooperates with a gear rack member 69, mechanically coupled to z-position cam 57 at a pivot point 71, causing z-position cam 57 to pivot about eccentric cam 51. A contact surface 73 of z-position cam 57 provides the slight movement necessary for precision z-axis adjustment against pin 28.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, adjustable lens mount 10 could be used for various types of optical components other than cylindrical lenses, including a range of refractive or reflective optical devices. The apparatus of the present invention can use components fabricated from a range of materials, selected for specific requirements of the optical system. While rack-and-pinion mechanisms are particularly advantaged for providing controlled motion of $\theta_z$ cam 56 and z-positioning plate 44 when adjusted from above, other types of mechanical device could be used, such as friction-based or belt-driven devices. Cam action, because it converts rotational movement to linear movement, is particularly well suited for making adjustments manually. While $\theta_z$ cam 56 provides a drive member that is advantaged for manual high-resolution adjustment, other types of components could be used as the drive member for urging pin 28 to effect corresponding rotational motion of lens carrier 14. For example, automated actuators, such as various types of electromechanical or piezoelectric actuators, could alternately be used for adjusting the position of pin 28 to effect $\theta_z$ rotation, either using $\theta_z$ cam 56 or using some other device that provides a suitable contact surface. A simple adjustment screw could be used for providing linear motion against positioning pin 28; however, such an arrangement requires at least some access space from the side of adjustable lens mount 10. Loading force holding pin 28 against the contact surface of $\theta_z$ cam 56 can be provided in a number of ways, such as using an arrangement of springs, magnets, or other components. Pin 28 can be some other type of extended member that allows some amount of rotation of lens carrier 14 within base 12.

It can be appreciated that the apparatus of the present invention provides an adjustable mount for an optical component that allows adjustments relative to the optical or z axis to be made from one side of the mount. Thus, the apparatus of the present invention is advantaged for equipment in which spacing constraints limit the options for adjustment access. It can be appreciated that the adjustments needed can be provided manually or can be effected using a motor or other automated apparatus.

Thus, what is provided is an apparatus and method for mounting a cylindrical lens or other optical component, independently adjustable in position along or rotationally about an optical axis, in an optical system like that of a laser printer.

PARTS LIST 10 adjustable lens mount
12 base
14 lens carrier
16 optical opening
18 lens
20 V-shaped track
22 flat rails
24 positioning housing
26 cylindrical lens axis
28 pin
30 alignment tool
32 bracket
34 pin
36 hole
38 mounting bolt
40 z-adjust pinion
42 gear
44 z-positioning plate
46 pin
48 slot
50 eccentric cam
51 eccentric cam
52 clamping screw
54 pin
56 $\theta_z$ cam
57 z-position cam
58 hole
60 spring
64 pivot pin
66 fine $\theta_z$ adjust pinion
67 fine z-adjust pinion
68 gear rack member 69 gear rack member
70 pivot point
71 pivot point
72 contact surface
73 contact surface
74 locking screw
76 bore

What is claimed is:

1. An adjustable mount for positioning an optical component relative to an optical axis comprising:
   (a) a carrier for housing said optical component;
   (b) a mount supporting said carrier along said optical axis, wherein said carrier is movable within said mount in at least one direction;
   (c) an extended member coupled to said carrier for setting a position of said carrier within said mount;
   (d) a movable cam for urging said extended member to effect movement in said at least one direction; and
   wherein said mount comprises an outwardly opening V-channel.

2. An adjustable mount according to claim 1 wherein said at least one direction is substantially orthogonal to said optical axis.

3. An adjustable mount according to claim 1 wherein said at least one direction is substantially parallel to said optical axis.

4. An adjustable mount according to claim 1 wherein said cam comprises an arcuate surface for contact with said extended member.

5. An adjustable mount according to claim 1 wherein said carrier is substantially cylindrical.

6. An adjustable mount for positioning an optical component relative to an optical axis comprising:
   (a) a carrier for housing said optical component;
   (b) a mount supporting said carrier along said optical axis, wherein said carrier is movable within said mount in at least one direction;
   (c) an extended member coupled to said carrier for setting a position of said carrier within said mount;
   (d) a movable cam for urging said extended member to effect movement in said at least one direction; and
   further comprising an adjustment gear pivotally hinged to said cam for controlling cam movement over an arc.

7. An adjustable mount according to claim 1 further comprising a spring applying a force to load said extended member against said cam.

8. An adjustable mount for positioning an optical component relative to an optical axis comprising:
   (a) a carrier for housing said optical component;
   (b) a mount supporting said carrier along said optical axis, wherein said carrier is movable within said mount in at least one direction;
   (c) an extended member coupled to said carrier for setting a position of said carrier within said mount;
   (d) a movable cam for urging said extended member to effect movement in said at least one direction; and
   wherein said extended member is removably attached to said carrier.

9. A positioning device for disposing an optical component rotationally about an optical axis, said positioning device comprising:
   (a) a carrier for housing said optical component, said carrier supported along said optical axis and rotatable about a center of rotation substantially coincident with said optical axis;
   (b) an extended member coupled to said carrier and extending away from said optical axis for setting the rotation angle of said carrier; and
   (c) a drive member comprising a movable contact surface for urging said extended member in a direction substantially orthogonal to said optical axis, thereby adjusting said angle of said carrier about said optical axis.

10. A positioning device according to claim 9 wherein said drive member comprises a cam.

11. A positioning device according to claim 9 wherein said contact surface of said cam is arcuate.

12. A positioning device according to claim 9 wherein said carrier is supported within an outwardly opening V-channel.

13. A positioning device according to claim 9 wherein said carrier is substantially cylindrical.

14. A positioning device according to claim 10 further comprising an adjustment gear pivotally hinged to said cam for controlling cam movement over an arc.

15. A positioning device according to claim 9 further comprising a spring applying a loading force to said extended member against said contact surface.

16. A positioning device according to claim 9 further comprising:
   (d) a linear movement plate pivotally hinged to an adjustment gear, said linear movement plate having said contact surface for urging said extended member in a direction along said optical axis, thereby moving said carrier linearly with respect to said optical axis.

17. A positioning device according to claim 9 wherein said drive member comprises a piezoelectric actuator.

18. A positioning device according to claim 9 wherein said drive member comprises an electromechanical actuator.

19. A positioning device according to claim 9 wherein said extended member is removably attached to said carrier.

20. A positioning device for disposing an optical component rotationally about an optical axis, said positioning device comprising:
   (a) a carrier for housing said optical component, said carrier supported along said optical axis and rotatable about a center of rotation substantially coincident with said optical axis;
   (b) an extended member coupled to said carrier and extending away from said optical axis for setting a rotation angle of said carrier; and
   (c) a movable cam for urging said extended member in a direction substantially orthogonal to said optical axis, thereby adjusting said angle of the carrier about said optical axis.

21. A positioning device according to claim 20 wherein said surface of said cam in contact with said extended member is arcuate.

22. A positioning device according to claim 20 wherein said carrier is supported within an outwardly opening V-channel.

23. A positioning device according to claim 20 wherein said carrier is substantially cylindrical.

24. A positioning device according to claim 20 further comprising an adjustment gear pivotally hinged to said cam for controlling cam movement over an arc.

25. A positioning device according to claim 20 further comprising a spring for forcing said extended member against said cam.

26. A positioning device according to claim 20 further comprising:

(d) a linear movement plate pivotally hinged to an adjustment gear, said linear movement plate having a z-axis contact surface for urging said extended member in a direction along the optical axis, thereby moving said carrier linearly with respect to said optical axis.

27. A positioning device according to claim 20 wherein said extended member is removably attached to said carrier.

28. A positioning device for disposing an optical component at a linear position along an optical axis and rotationally about said optical axis, the positioning device comprising:
   (a) a carrier for housing said optical component, said carrier supported along said optical axis and rotatable about a center of rotation substantially coincident with said optical axis;
   (b) an extended member coupled to said carrier and extending away from said optical axis for setting a rotation angle of said carrier;
   (c) a movable cam disposed for urging said extended member in a direction substantially orthogonal to said optical axis, thereby adjusting said angle of said carrier about said optical axis; and
   (d) a linear movement plate pivotally hinged to an adjustment gear, said linear movement plate having a contact surface for urging said extended member in a direction along said optical axis, thereby moving said carrier linearly with respect to said optical axis.

29. A positioning device according to claim 28 wherein said cam contact surface is arcuate.

30. A positioning device according to claim 28 wherein said carrier is supported within an outwardly opening V-channel.

31. A positioning device according to claim 28 wherein said carrier is substantially cylindrical.

32. A positioning device according to claim 28 further comprising a rack-and-pinion adjustment mechanism for controlling position of said cam.

33. A positioning device according to claim 28 further comprising a spring for forcing said extended member against said cam.

34. A positioning device for disposing an optical component at a linear position along an optical z axis and rotationally about said optical z axis, said positioning device comprising:
   (a) a carrier for housing said optical component, said carrier supported along said optical z axis and rotatable about a center of rotation substantially coincident with said optical z axis;
   (b) an extended member coupled to said carrier and directed away from said optical axis, said extended member rotatable in an x-y plane for adjusting a rotation angle of said carrier about said optical z axis and movable in a z direction for adjusting a linear position of said carrier along said optical z axis; and
   (c) a positioning housing comprising:
      (i) a rotational angle cam disposed for urging said extended member in a direction within said x-y plane, thereby adjusting said angle of said carrier about said optical z axis; and
      (ii) a linear positioning cam comprising at least a first z-axis contact surface for urging said extended member in a direction substantially parallel to said optical z axis.

35. A positioning device according to claim 34 wherein movement of said rotational angle cam is effected by rotation of an adjustment pinion.

36. A positioning device according to claim 34 wherein movement of said linear positioning cam is effected by rotation of an adjustment pinion.

37. A positioning device according to claim 34 wherein said positioning housing is removable from said carrier following adjustment.

38. A method for disposing an optical component rotationally about an optical axis, comprising:
   (a) seating said optical component within a carrier;
   (b) supporting said carrier along said optical axis;
   (c) providing a rotational control member outwardly extended from said carrier; and
   (d) setting a position of said rotational control member by:
      (i) applying a loading force in a direction orthogonal to said optical axis to force said rotational control member against a contact surface; and
      (ii) moving said contact surface to urge said rotational control member against said loading force, thereby adjusting an angle of the carrier about said optical axis.

39. A method for disposing an optical component according to claim 38 wherein the step of moving said contact surface comprises the step of moving a cam.

40. A method for disposing an optical component according to claim 38 wherein the step of applying said loading force comprises the step of extending a spring.

41. A method for disposing an optical component according to claim 38 wherein the step of moving said contact surface comprises the step of adjusting a pinion.

42. A method for disposing an optical component linearly along an optical axis, comprising:
   (a) seating said optical component within a carrier;
   (b) supporting said carrier along said optical axis;
   (c) providing a linear position control member outwardly extended from said carrier; and
   (d) urging said linear position control member in a direction substantially parallel to said optical axis by pivoting a movable plate about a pivot point, said movable plate having at least one contact surface for moving said linear position control member.

* * * * *